United States Patent [19]
Honey

[11] 3,803,478
[45] Apr. 9, 1974

[54] FREQUENCY CHANGER HAVING A CONSTANT FREQUENCY OUTPUT

[75] Inventor: John F. Honey, Newport Beach, Calif.

[73] Assignee: United States Energy Corporation, Long Beach, Calif.

[22] Filed: Oct. 2, 1972

[21] Appl. No.: 294,107

[52] U.S. Cl. .................................. 321/7, 321/69 R
[51] Int. Cl. ............................................. H02m 5/16
[58] Field of Search .......................................... 321/7

[56] References Cited
UNITED STATES PATENTS

| | | | |
|---|---|---|---|
| 3,350,621 | 10/1967 | Caldwell | 321/7 |
| 3,431,483 | 3/1969 | Lafuze | 321/7 |
| 3,315,143 | 4/1967 | Lawrence et al. | 321/7 |
| 3,337,788 | 8/1967 | Pelly | 321/7 |

Primary Examiner—William M. Shoop, Jr.
Attorney, Agent, or Firm—Christie, Parker & Hale

[57] ABSTRACT

A frequency changer having an adjustable constant frequency output with a higher fixed or variable frequency input from a polyphase source, such as a 3-phase alternator, provides a current path through a utilization means in one direction for a first interval of time and a current path in the opposite direction for a second interval of time with the current paths being alternately applied at the selected constant frequency. The alternate application of the paths is under the control of a circuit that includes a first group of thyristors connected in a bridge circuit for the first direction of current flow and a second group of thyristors connected in a bridge circuit for the opposite direction of current flow. Each group is triggered on for selected intervals of time. The frequency changer is useful in a vehicular power system with the system providing single-phase output power at the frequency and voltage desired. The vehicular power system includes in addition to the frequency changer, a polyphase alternator, a variable speed mechanical drive, driving the alternator, and a voltage regulator.

10 Claims, 6 Drawing Figures

FREQUENCY CHANGER HAVING A CONSTANT FREQUENCY OUTPUT

BACKGROUND OF THE INVENTION

1. Field of the Invention:

This invention relates to frequency changers and more particularly to a frequency changer system having a selected constant frequency output which may advantageously be employed in a vehicular power system.

A constant frequency voltage output at a particular frequency is required for the operation of numerous devices. For example, induction motors are designed for efficient use at only one particular frequency with minimum variation therefrom permitted. Similarly, cement vibrators and many electrical tools are designed to operate at the particular frequency of 180-hertz. Constant frequency sources are also required for powering equipment employed in aircraft with the typical frequency being 400-hertz. Thus, in many fields it is desirable and sometimes necessary to have a source of power at one particular frequency. One of the fields of particular interest is the recreational vehicle field where it is desirable to employ the relatively low cost air conditioning units that require a voltage input at 60-hertz.

2. Description of the Prior Art:

Although there are frequency changers that are relatively efficient and inexpensive for converting one constant frequency to another constant frequency, there does not appear to be any such frequency changers where the input frequency is variable. For example, various methods have been employed in the past to provide a constant frequency output from an alternator being driven by a variable speed engine. Frequency changers for such an application have included electronic devices, mechanical devices such as Salsbury clutches and hydraulic devices controlling pulleys. The mechanical and hydraulic devices are generally bulky and relatively expensive. Additionally, in the recreational vehicle field it has been found in the past that one effective way of providing power for the air conditioning units is to employ a separate gasoline engine driving an alternator at a fixed speed or through a mechanically or hydraulically controlled frequency changer. In addition to the bulkiness and expense of such a system, it has been found that the gasoline engines are relatively noisy. Thus, it is desirable in the recreational vehicle field to do away with the separate noisy gasoline-powered engine driving a generator for the production of a relatively constant frequency source of power.

SUMMARY OF THE INVENTION

The disadvantages of these frequency changers are overcome in accordance with the frequency changer of this invention. The frequency changer of this invention provides an adjustable constant frequency output with a higher fixed frequency or variable frequency input from a polyphase source, such as a 3-phase alternator, has a current path through a utilization means in one direction for a first interval of time and a current path in the opposite direction for a second interval of time, with the current paths being alternately applied at the selected constant frequency. The current through the two paths is controlled to provide an alternating current output at the utilization means at the selected frequency. The current paths advantageously each include a plurality of triggerable switching devices such as thyristors with the thyristors being connected in bridge circuits and with the control element of the thyristor being coupled to a circuit means for supplying the trigger current for the thyristors for selected intervals of time.

A free-running multivibrator that has an output frequency related to the selected frequency for the frequency changer output controls the application of the trigger current to the thyristors in the bridge circuits. The free-running multivibrator has an output pulse on one output terminal for the beginning of the positive half-cycle of the output from the frequency changer and another output pulse on a second output terminal for the beginning of the negative half-cycle of the output from the frequency changer. The pulses on the two output terminals of the free-running multivibrator separately trigger monostable multivibrators, each having an output pulse of a selected duration that is applied to a triggered astable multivibrator. Each astable multivibrator generates a plurality of time-spaced-apart trigger pulses at a selected repetition rate for the duration of the output pulse from the associated monostable multivibrator, with the trigger pulses being applied to the thyristors. The resultant frequency changer is relatively compact and inexpensive compared to the prior art devices.

The frequency changer of this invention may be advantageously combined with a polyphase vibrator, a variable speed mechanical drive driving the alternator, and a voltage regulator to produce a vehicular power supply that is relatively inexpensive, quiet, and compact.

BRIEF DESCRIPTION OF THE DRAWINGS

The above and other features and advantages of the present invention may be understood more fully and completely upon consideration of the following specification and drawings, in which.

DESCRIPTION OF THE PREFERRED EMBODIMENT

Figure 1:
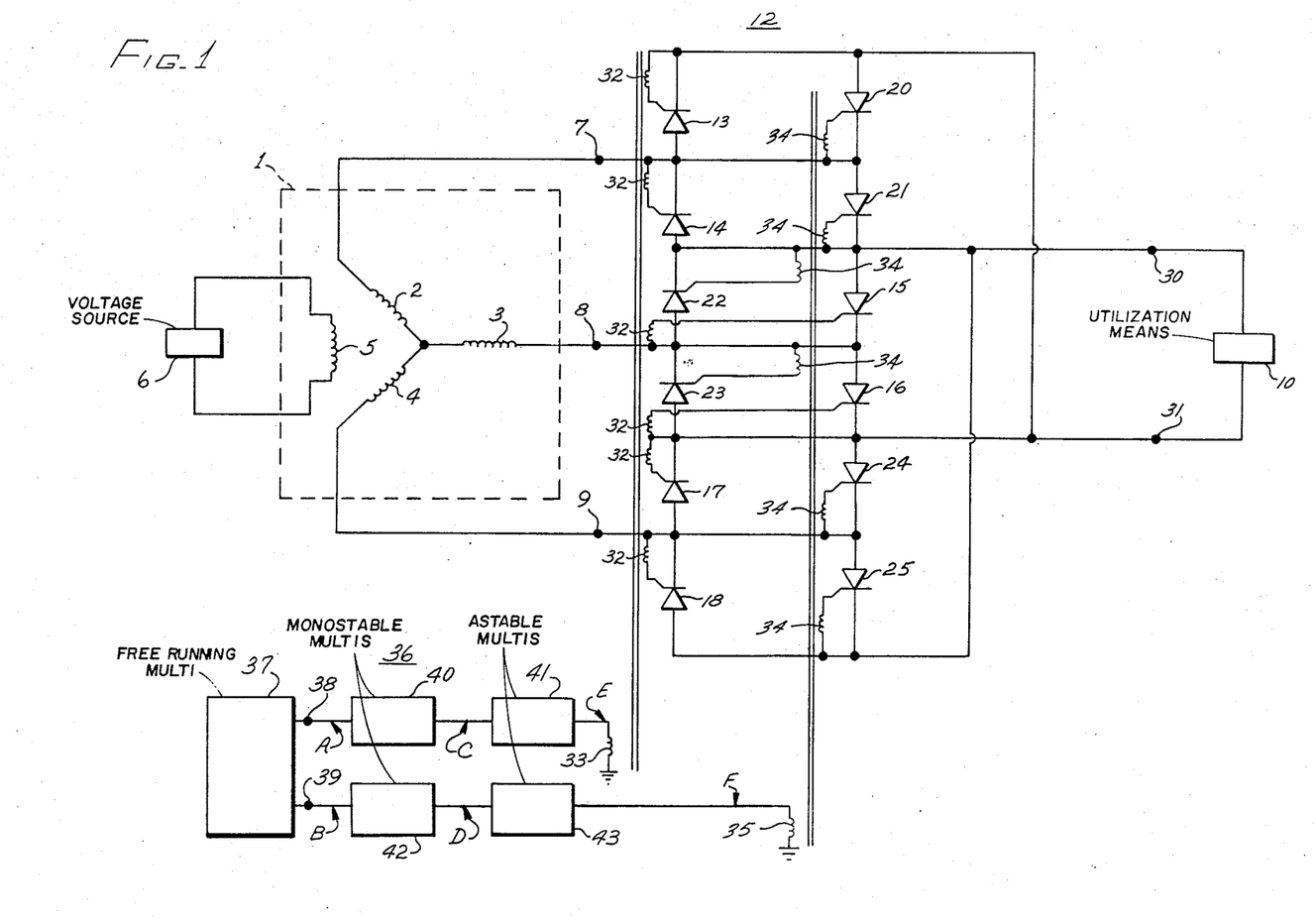
FIG. 1 is a schematic circuit diagram of the frequency changer in accordance with the present invention.

A frequency changer in accordance with the present invention is shown schematically in FIG. 1. The changer is connected between a utilization means 10 and polyphase source 1 which is schematically shown in FIG. 1 as a 3-phase alternator connected in a "Y" configuration. Alternatively, the alternator could be connected in a Delta configuration and/or have more phases than 3.

Source 1 has three windings 2, 3, and 4 with an excitation winding 5 that is shown in FIG. 1 as being connected to a separate source of controllable excitation voltage 6. Alternatively, the excitation winding 5 may be coupled to the output of the alternator 1 through control and rectifying means, to provide a self-excited alternator, as will be explained hereinafter. The output terminals 7, 8, and 9 of the alternator are connected to the frequency changer 12. Changer 12 provides a first controllable unidirectional current path from the output of the alternator 1 to the utilization means 10 for conduction of current in one direction through the utilization means 10 and a second controllable unidirectional current path from the output of the alternator 1 to the utilization means 10 in an opposite direction to the first path.

The current paths are provided by bridge circuits connected to the output of alternator 1, which bridge circuits are representatively shown as including silicon controlled rectifiers. Other thyristors or controlled rectifiers may be employed. A first bridge circuit for conduction of current in one direction includes silicon controlled rectifiers 13, 14, 15, 16, 17 and 18. The bridge circuit for current flow in the opposite direction includes silicon controlled rectifiers 20, 21, 22, 23, 24, and 25. The anodes of silicon controlled rectifiers 13, 16, and 17 are respectively connected to output terminals 7, 8, and 9 of alternator 1 while the cathodes thereof are connected in common to the lower output terminal 31 of the frequency changer system. The cathodes of silicon controlled rectifiers 14, 15, and 18 are respectively connected to output terminals 7, 8, and 9 of alternator 1 while the anodes thereof are connected in common to the output terminal 30 of the frequency changer system.

In the second current path, the anodes of silicon controlled rectifiers 21, 22, and 25 are respectively coupled to output terminals 7, 8, and 9 of the alternator 1 while the anodes thereof are connected in common to the upper output terminal 30 of the frequency changer system. The cathodes of silicon controlled rectifiers 20, 23, and 24 of the second current path are respectively coupled to output terminals 7, 8, and 9 of alternator 1 while the anodes thereof are connected in common to the lower output terminal 31 of the frequency changer system.

The gate of each silicon controlled rectifier 13 through 18 in the first current path is magnetically coupled through a winding 32 to a winding 33. Similarly, the gate of each silicon controlled rectifier 20 through 25 of the second current path is magnetically coupled through a winding 34 to a winding 35. Each winding 32 is connected between the gate and cathode of the silicon controlled rectifiers 13 through 18 while each winding 34 is connected between the gate and cathode of the silicon controlled rectifiers 20 through 25. Trigger pulses are selectively applied to windings 33 and 35 through the circuit means 36 for alternately activating the current paths at a selected rate.

The activating circuit means 36 of the frequency changer 12 is shown in block form in FIG. 1 and includes a free-running multivibrator 37 having two output terminals 38 and 39. Output terminal 38 is connected to a monostable multivibrator 40 that is triggered on by the output from multivibrator 37. Monostable multivibrator 40 is connected to the input of an astable multivibrator 41 which is triggered on by the output of monostable multivibrator 40 and remains on for the duration of the output pulse from monostable multivibrator 40.

The second output terminal 39 of the free-running multivibrator 37 is connected to the input of a monostable multivibrator 42 which drives an astable multivibrator 43 for the duration of each pulse at the output of multivibrator 42.

Figure 2:
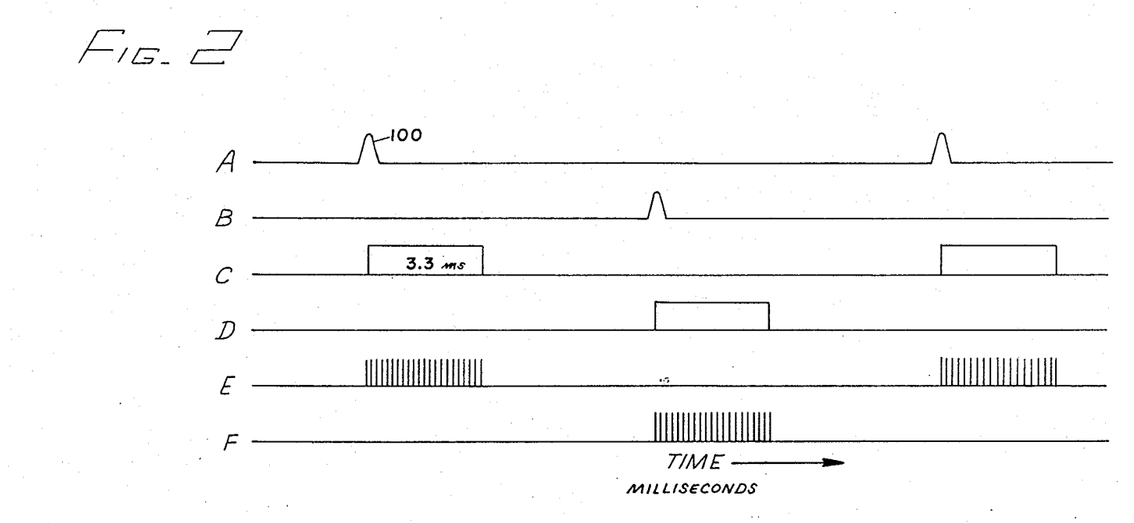
FIG. 2 is a chart showing typical time relationships between the signals at various points in the frequency changer of FIG. 1, with a time scale in milliseconds, which chart is helpful in understanding the present invention.
Figure 3:
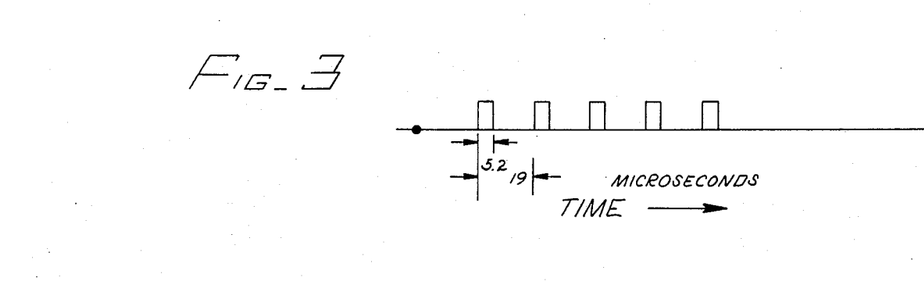
FIG. 3 is a time chart showing the output pulses at points E or F in FIG. 1 on the expanded time scale of microseconds.

The operation of the frequency changer system of FIG. 1 may be understood more easily by referring to the timing charts of FIGS. 2 and 3 wherein the wave forms of signals appearing at various points in the frequency changer system of FIG. 1 are depicted.

The 3-phase alternator 1 is driven at some speed by a variable speed prime mover such as an automobile or recreational vehicle engine, for example. The alternator may be a two-pole, four-pole, or some multiple-pole device so that the output frequency of the alternator may be some multiple of the rotational speed of the engine or equal to the rotational speed of the driving engine, and, in any case, equal to or greater than the selected output frequency for the changer. Assuming a four-pole alternator, then the output frequency of the alternator is twice the rotational speed of the driving engine if directly coupled thereto. However, other couplings may be employed, such as pulleys or gears, and the alternator may rotate at a different speed. Assuming a coupling that causes a four-pole alternator to rotate at three times the speed of the prime mover, than at an idling speed of 600 RPM, the alternator shaft will rotate at a speed of 1800 RPM's. At this rotational speed the output frequency of the four-pole alternator is 60-hertz. Of course, as the speed of the engine increases above the idling speed, the frequency of the output voltage from the alternator will also increase. Assuming, for purposes of illustration, that the alternator is being driven so that the output frequency is considerably above an assumed desired output frequency of 60-hertz, the frequency changer system will convert this output frequency to the selected constant output frequency in the following manner:

Free-running multivibrator 37 produces an output pulse on output terminal 38 at a repetition rate that is the same as the desired output frequency from the frequency changer. The multivibrator 37 will also have an output pulse on output terminal 39 at a repetition rate that is the same as the selected output frequency from the changer. These output pulses are representatively shown by curves A and B in FIG. 2. The output pulse 100 appearing at the output terminal 38 will trigger the monostable multivibrator 40 which will produce the output representatively shown by curve C in FIG. 2. The duration of the output pulses from monostable multivibrators 40 and 42 is selected to provide sufficient time between the removal of the trigger pulses from one current path and the application of trigger pulses to the other current path to permit the silicon controlled rectifiers to turn off in the one current path, with a particular load such as an inductive load, before the silicon controlled rectifiers in the other current path turn on. With an output frequency from the alternator of 60-hertz or greater, the pulse duration of the output pulse from multivibrator 40 and multivibrator 42 may advantageously be 3.3 milliseconds.

The output pulse from multivibrator 40 is applied to triggerable astable multivibrator 41 to turn this multivibrator on. Astable multivibrator 41 produces a series of pulses that is representatively shown by curve E in FIG. 2. Similarly, astable multivibrator 43 is turned on by the output pulse from monostable multivibrator 42 and produces a series of pulses during the duration of the output pulse from multivibrator 42 which is representatively shown by curve F in FIG. 2. Each pulse at the output of multivibrators 41 and 43 are of sufficient duration of trigger on the silicon controlled rectifiers that are respectively controlled by multivibrator 41 and multivibrator 43. The duration and repetition rate of the pulses at the output of multivibrators 41 and 43 in the case of a frequency changer for a 60-hertz constant frequency output with a 3-phase alternator may advantageously be 5.2 microseconds and 19 microseconds, respectively, as shown in FIG. 3. The duration and repetition rate of these pulses as well as the interval of time during which pulses are produced and the interval between such intervals are determined by the anticipated frequency changer input frequency, the selected output frequency and by the characteristics of the thyristors employed.

Figure 4:
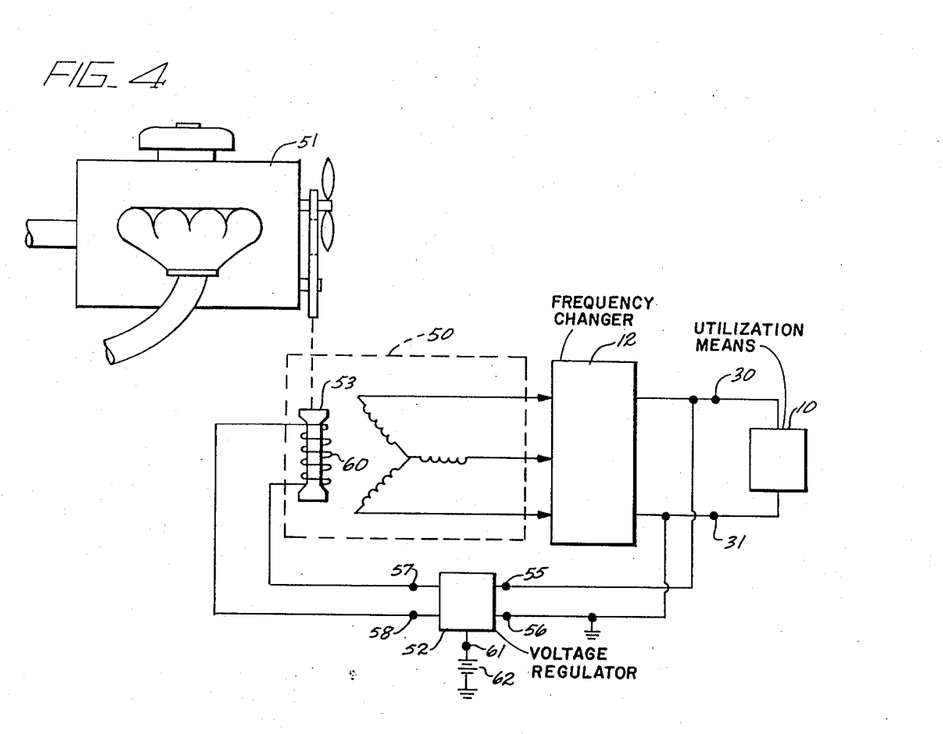
FIG. 4 is a diagram, partially in block form and partially in schematic form, of a vehicular power system in accordance with the present invention.

The frequency changer of this invention may advantageously be employed in a vehicular power system as shown in FIG. 4. The frequency changer 12 of FIG. 1 is shown in block form in FIG. 4 and is employed in combination with a polyphase alternator 50, a variable speed mechanical drive 51, driving the alternator 50, and a voltage regulator 52 connected between the output of the changer 12 and the rotor 53 of the alternator 50.

A utilization means 10 is connected to the output of the frequency changer 12. Upper output terminal 30 of the changer 12 is connected to input terminal 55 of the voltage regulator 52 while the lower output terminal 31 of changer 12 is connected to input terminal 56 of the regulator 52. Terminals 31 and 56 may also be connected to ground reference, as schematically shown in FIG. 4.

The voltage regulator 52 has two output terminals 57 and 58 connected across the field winding 60 on the rotor 53 of alternator 50. The alternator 50 is a self-excited alternator, as depicted in FIG. 4. The voltage regulator 52 is shown in more detail in the schematic diagram of FIG. 5. The voltage regulator 52 has an additional input terminal 61 which is connected to ground reference through a battery 62, which battery may be the battery for the mechanical drive 51 which is representatively shown as an internal combustion engine in FIG. 4. In one specific application, the internal combustion engine 51 may be the engine for a recreational vehicle while the utilization means 10 may be the compressor motor for an air conditioner for the recreational vehicle.

Figure 5:
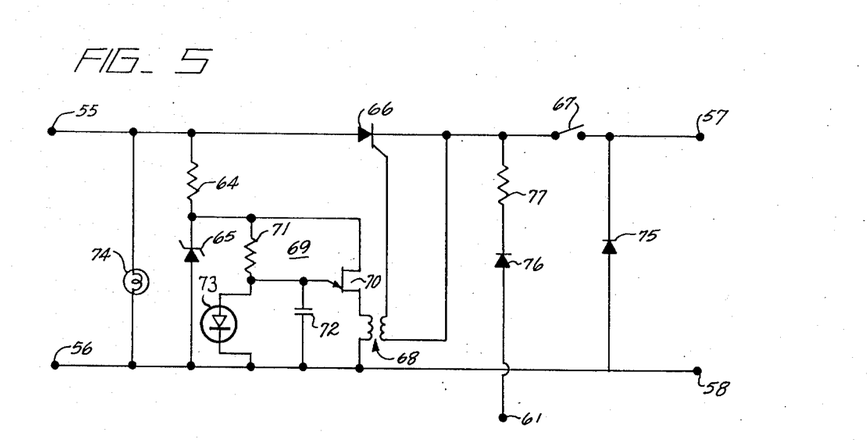
FIG. 5 is a schematic diagram of the voltage regulator of the system of FIG. 4.

The voltage regulator schematically shown in FIG. 5 includes a resistor 64 connected in series with a Zener diode 65 across the input terminals 55 and 56. The Zener diode 65 and resistor 64 cooperate to provide a constant positive voltage at the junction of the diode and the resistor during the time the voltage output from changer 12 is above a selected value. The voltage regulator further includes a silicon controlled rectifier 66 connected between input terminal 55 and output terminal 57 through a switch 67. The anode of the silicon controlled rectifier 66 is connected to terminal 55 while the cathode is connected to switch 67. The secondary of a trigger pulse transformer 68 is connected between the control electrode and cathode of the rectifier 66. The trigger pulses for the rectifier 66 are provided by a relaxation oscillator 69 in response to the RMS value of the voltage at the output of the frequency changer 12. A unijunction transistor 70 is the active element of the oscillator 69. The upper base of unijunction transistor 70 is connected to the junction of resistor 64 and Zener diode 65 and the lower base is connected to input terminal 56 through the primary of pulse transformer 68. The emitter of the unijunction transistor 70 is connected through a resistor 71 to the junction between resistor 64 and Zener diode 65. The emitter of the unijunction transistor 70 is also connected to input terminal 56 through a capacitor 72 and a photodiode 73 connected in parallel.

The RMS value of the output voltage of the frequency changer which appears across input terminals 55 and 56 of the voltage regulator is sensed by a lamp 74 connected across the input terminals 55 and 56. The light emitted from the lamp 74 falls upon the photodiode 73, which diode has a resistance that decreases as the light intensity from lamp 74 increases and vice versa. As a consequence, the resistance presented by photodiode 73 across the timing capacitor 72 of the relaxation oscillator 69 is responsive to the RMS value of the output voltage of the frequency changer 12 and varies as the RMS value of this voltage varies.

The voltage regulator further includes a diode 75 connected across the output terminals 57 and 58 which functions as a flywheel diode across the winding 60 of the rotor 53 to provide field excitation in the alternator 50 during the interval of time that no voltage appears at the output terminals 57 and 58 and silicon controlled rectifier 66 is non-conducting.

As the voltage at terminal 55 with respect to terminal 56 goes positive, capacitor 72 will charge toward a voltage determined by resistor 71 and photodiode 73. When this voltage reaches a level sufficient to break down the unijunction transistor 70, the transistor will conduct and the capacitor 72 will discharge through the primary of the pulse transformer 68. As a consequence a trigger pulse is applied through transformer 68 to silicon controlled rectifier 66 to turn on the rectifier 66. Once triggered on and during the remainder of the positive half-cycle silicon controlled rectifier 66 conducts and current is delivered to the field winding of alternator 50.

If the output voltage from the frequency changer is below a selected level, lamp 74 will be dimmer than nominal brilliance and the resistance of photodiode 73 will be higher than nominal. This shortens the time required for the capacitor 72 to reach the peak point voltage of unijunction transistor 70 so that a trigger pulse is applied earlier in the positive half-cycle to the silicon controlled rectifier 66, thereby increasing the field current delivered to the alternator 50. This in turn increases the output voltage from the frequency changer 12. An increase in the RMS value of the voltage at the output of changer 12 will also be sensed by lamp 74 and photodiode 73 with a resultant decrease in field current and a consequent reduction in the RMS value of the changer 12 voltage.

When the alternator 50 is started, no output voltage is produced since there is no applied field. Therefore, at the beginning of rotation of the alternator 50, the voltage from the vehicle battery 62 is applied to the field winding 60 at the output of terminals 57 and 58 of regulator 52 through a diode 76 and a current-limiting resistor 77. Diode 76 and resistor 77 are connected in series between input terminal 61 and output terminal 57 of the regulator 52 through switch 67. Switch 67 functions as a control switch for activating the vehicular power supply.

The use of the lamp 74 as the sensing element effects control of the RMS value of the output voltage of frequency changer 12 rather than the average or peak value of this voltage. This is effective in reducing flicker of any connected lighting load which might otherwise result from variation in the waveform of the output voltage from the frequency changer.

The schematic diagram of the voltage regulator 52 represents only one of a variety of circuits capable of performing the required functions. For example, a photo-transistor may be used instead of the photodiode 73 and fullwave rectification may be employed instead of the halfwave rectification.

Figure 6:
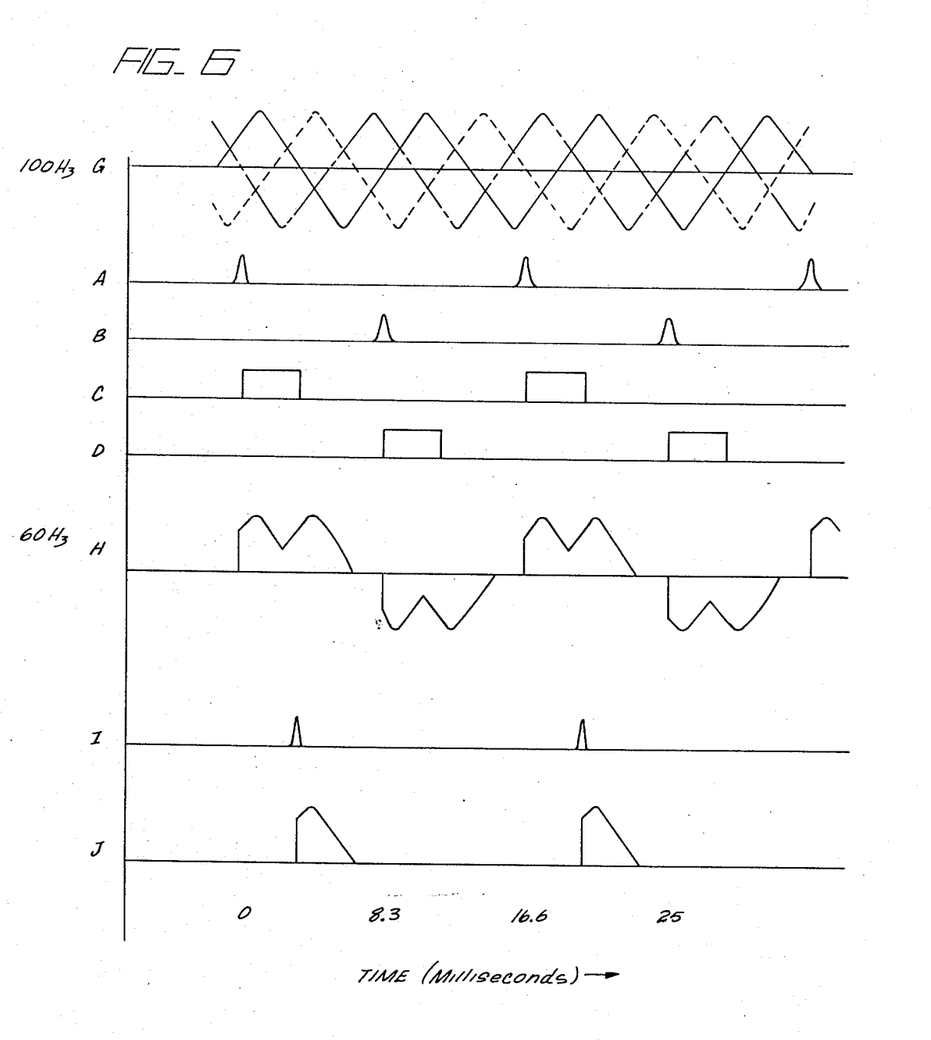
FIG. 6 is a chart showing typical time relationships between voltage signals at various points in the vehicular power system of FIG. 4 employing the voltage regulator of FIG. 5 and the frequency changer of FIG. 1 in accordance with this invention.

In one illustrative example, the waveforms for typical signals at specific points in the vehicular power system of FIG. 4 employing the frequency changer of FIG. 1 and the voltage regulator of FIG. 5, are shown in FIG. 6. It is to be noted that the waveforms are only illustrative and are not exact copies of the waveforms that might appear in the vehicular power supply of FIG. 4. Assuming that the variable speed of 600 RPM and that the coupling between the drive 51 and rotor 53 of the alternator 50 provides a 5:1 ratio such that the alternate rotor 53 is turning at a speed of 3000 RPM, then a four-pole alternator will have an output frequency of 100-hertz. The voltage waveforms for such an output frequency for a 3-phase alternator is shown in curve G on FIG. 6. It is to be noted that the time scale for the curves in FIG. 6 is milliseconds and that the voltage waveforms of curve G are for a 100-hertz output voltage from the alternator 50. The timing pulses at the output of the free-running multivibrator 37 of the frequency changer 12 for a 60-hertz constant frequency output are shown in curves A and B of FIG. 6. Additionally, the waveforms of the signals at the output of multivibrators 40 and 42 during which timing trigger pulses are applied to the thyristors of the frequency changer 12 are shown in curves C and D of FIG. 6.

Typical voltage waveforms at the output of frequency changer 12 are represented by curve H of FIG. 6 and this is the voltage that is applied to the input terminals 55 and 56 of the voltage regulator 52. The trigger pulses across the secondary of transformer 68 are representatively shown in curve I on FIG. 6 and the output voltage of the voltage regulator 52 is representatively shown by curve J in FIG. 6. The trigger pulses of curve I will appear earlier when the RMS value of the voltage is below the selected level and later if this voltage is above the selected level. As shown by curve J current does not flow through silicon controlled rectifier 66 until the trigger pulse is applied.

Various modifications may be made in the details of construction without departing from the spirit and scope of this invention, as defined by the appended claims.

What is claimed is:

1. A frequency changer having a selectable constant frequency output comprising:
   a first controllable current path from the output of a polyphase source to a utilization means for providing a path for current flowing through the utilization means in a first direction,
   a second controllable current path from the output of the polyphase source to the utilization means for providing a path for current flowing through the utilization means in a direction opposite to the first direction, each current path including a plurality of triggerable switching devices, and
   circuit means for alternately activating the current paths at a selected frequency, the circuit means including means for providing a plurality of time-spaced-apart pulses in parallel to each triggerable switching device in the first controllable current path, so as to activate that current path on each first half-cycle of said frequency, and means for providing a plurality of time-spaced-apart pulses in parallel to each triggerable switching device in the second controllable current path so as to activate that current path on each second, opposite half-cycle of said frequency.

2. In combination,
   a polyphase alternator having a variable frequency output; and
   a frequency changer having an adjustable constant frequency output equal to or below the output frequency of the alternator;
   the frequency changer comprising
   a first controllable current path from the output of the alternator to a utilization means,
   a second controllable current path from the output of the alternator to the utilization means in a direction opposite to the first current path, each current path including a plurality of triggerable switching devices, and
   circuit means for alternately activating the current paths at the selected frequency for the output of the frequency changer, the circuit means including means for providing a plurality of time-spaced-apart pulses in parallel to each triggerable switching device in the first controllable current path so as to activate that current path on each first half-cycle of the selected frequency, and means for providing a plurality of time-spaced-apart pulses to each triggerable switching device in the second controllable current path so as to activate that path on each second, opposite half-cycle of the selected frequency.

3. The combination in accordance with claim 2 wherein the alternator is self-excited.

4. The combination in accordance with claim 2 further including a source of excitation voltage and means for coupling the source to the excitation winding of the alternator.

5. The combination in accordance with claim 2 wherein the triggerable switchin devices in the first controllable current path are arranged in a bridge circuit connected across the output of the alternator and the triggerable switching devices in second controllable current path are arranged in a second bridge circuit connected across the output of the alternator.

6. The combination in accordance with claim 5 wherein each of the triggerable switching devices is a thyristor.

7. The combination in accordance with claim 6 wherein the activating means includes a pulse generator operating at the selected frequency,
the generator having two output terminals,
means for applying a pulse to the first output terminal at the selected frequency, and
means for applying a pulse to the second output terminal at the selected frequency and in the middle of the pulses applied to the first output terminal;
a first monostable multivibrator connected to the first output terminal;
a second monostable multivibrator connected to the second output terminal,
each multivibrator having a pulse output for a selected duration;
a first triggerable astable multivibrator connected to the output of the first monostable multivibrator for generating pulses at a selected rate during each output pulse from the first monostable multivibrator;
a second triggerable astable multivibrator connected to the output of the second monostable multivibrator for generating pulses at a selected rate during each output pulse from the second monostable multivibrator;
means for coupling the output pulses from the first astable multivibrator to the gates of the thyristors in the first bridge circuit; and
means for coupling the output pulses from the second astable multivibrator to the gates of the thyristors in the second bridge circuit.

8. A frequency changer for converting a variable frequency output from a polyphase alternator to a selected constant frequency voltage comprising:
a first bridge circuit with controllable elements connected across the output of the alternator for conduction of current in a first direction through a utilization means,
a second bridge circuit with controllable elements connected across the output of the alternator for conduction of current in a second direction through a utilization means,
the second direction being opposite to the first direction, and
circuit means for biasing the elements of the first bridge circuit on and then the elements of the second bridge circuit on to produce an output having the selected frequency the circuit means including means for applying a plurality of time-spaced-apart pulses to each controllable element in the first bridge circuit so as to bias that bridge circuit on during each first half-cycle of the selected frequency, and means for applying a plurality of time-spaced-apart pulses to each controllable element in the second bridge circuit so as to bias that bridge circuit on during each second, opposite half-cycle of the selected frequency.

9. In combination,
a 3-phase alternator capable of being driven by a variable speed engine,
a first controllable unidirectional current path between the output of the alternator and a utilization means,
a second controllable unidirectional current path between the output of the alternator and a utilization means,
the second current path being in the opposite direction through the utilization means from the first current path,
each unidirectional current path including a plurality of triggerable switching devices, and
circuit means for alternately closing each current path for a selected interval of time with an interval of time between each selected interval of time of sufficient duration to assure the opening of one path before the closing of the other path, the circuit means including means for applying a plurality of time-spaced-apart pulses to each triggerable switching device in the first unilateral current path so as to close that path, and means for applying a plurality of time-spaced-apart pulses to each triggerable switching device in the second unilateral current path so as to close that path.

10. A vehicular power system comprising:
a polyphase alternator having a rotatable field winding,
a variable speed mechanical drive driving the alternator,
a frequency changer having a first controllable current path from the output of the alternator to a utilization means,
a second controllable current path from the output of the alternator to the utilization means in a direction opposite to the first current path,
circuit means for alternately activating the current paths at a selected rate;
a voltage regulator coupled between the output of the frequency changer and the field winding of the alternator, the voltage regulator comprising:
a controllable switch between the output of the frequency changer and the field winding of the alternator,
a relaxation oscillator for providing trigger pulses to the controllable switch at a selected rate that is variable in accordance with the RMS value of the voltage at the output of the frequency changer,
means for monitoring the RMS value of the voltage at the output of the frequency changer, and
means responsive to the monitoring means for varying the occurrence of the trigger pulse at the output of the relaxation oscillator to close the controllable switch earlier for RMS voltages below a selected level and later for RMS voltages above a selected level.

* * * * *

PO-1050
(5/69)

UNITED STATES PATENT OFFICE
CERTIFICATE OF CORRECTION

Patent No. 3,803,478          Dated April 9, 1974

Inventor(s) John F. Honey

It is certified that error appears in the above-identified patent and that said Letters Patent are hereby corrected as shown below:

In the Summary, Column 2, line 29, "vibrator" should read -- alternator --; in the Brief Description of Drawings, line 61, "withthis" should read -- with this --. In the claims, Column 8, line 61, "switchin" should read -- switching --.

Signed and sealed this 12th day of November 1974.

(SEAL)
Attest:

McCOY M. GIBSON JR.          C. MARSHALL DANN
Attesting Officer          Commissioner of Patents